United States Patent
Doan Huu (10) Patent No.: US 12,326,879 B2
(45) Date of Patent: Jun. 10, 2025

(54) COMPRESSION OF TARGET VARIABLE FOR MULTI-CLASS CLASSIFICATION

(71) Applicant: SAP SE, Walldorf (DE)

(72) Inventor: Jacques Doan Huu, Montigny le Bretonneux (FR)

(73) Assignee: SAP SE, Walldorf (DE)

( * ) Notice: Subject to any disclaimer, the term of this patent is extended or adjusted under 35 U.S.C. 154(b) by 6 days.

(21) Appl. No.: 18/357,294

(22) Filed: Jul. 24, 2023

(65) Prior Publication Data

US 2025/0036656 A1  Jan. 30, 2025

(51) Int. Cl.
*G06F 16/28* (2019.01)
*G06F 18/2415* (2023.01)

(52) U.S. Cl.
CPC ........ *G06F 16/285* (2019.01); *G06F 18/2415* (2023.01)

(58) Field of Classification Search
None
See application file for complete search history.

(56) References Cited

U.S. PATENT DOCUMENTS

| 2011/0137908 A1* | 6/2011 | Dom | G06F 16/353 707/E17.09 |
| 2015/0178303 A1* | 6/2015 | Shastri | G06F 16/2425 707/731 |
| 2016/0314182 A1* | 10/2016 | Zhang | H04L 43/04 |

FOREIGN PATENT DOCUMENTS

| CN | 110555134 A | * | 12/2019 | |
| CN | 106471490 B | * | 9/2020 | G06F 16/285 |

* cited by examiner

*Primary Examiner* — Augustine K. Obisesan
(74) *Attorney, Agent, or Firm* — Buckley, Maschoff & Talwalkar LLC (57) ABSTRACT

Systems and methods include determination of a dataset comprising a plurality of instances, each instance comprising a value of each of a plurality of input variables and of a target variable, where the values of the target variable comprise a plurality of categories, determination of two or more infrequent categories of the plurality of categories from the dataset, determination of two or more non-separable categories from the two or more infrequent categories based on the dataset, changing of occurrences of the two or more non-separable categories within the dataset to a single category to generate a modified dataset, and training of a classifier to output a value of the target variable based on the modified dataset.

15 Claims, 12 Drawing Sheets

| height | weight | eye color | animal |
|---|---|---|---|
| 256 | 1700 | brown | elephant |
| 35 | 8 | blue | cat |
| 110 | 120 | black | zebra |
| 95 | 150 | brown | lion |
| 105 | 145 | brown | lion |
| ... | ... | ... | ... |

*FIG. 4*

| category | frequency | relative frequency (%) | cumulative relative frequency (%) |
|---|---|---|---|
| panther | 8 | 0.31 | 0.31 |
| zebra | 12 | 0.47 | 0.78 |
| elephant | 20 | 0.71 | 1.49 |
| lion | 23 | 0.90 | 2.39 |
| cat | 700 | 27.31 | 29.70 |
| dog | 1800 | 70.30 | 100.00 |

| actual category | predicted category | prediction accuracy |
|---|---|---|
| panther | panther | 1 |
| panther | elephant | 0 |
| elephant | elephant | 1 |
| elephant | elephant | 1 |
| elephant | elephant | 1 |
| zebra | lion | 0 |
| zebra | panther | 0 |
| ... | ... | ... |

*FIG. 8*

| category | binary classification rate |
|---|---|
| panther | 25% |
| zebra | 34% |
| lion | 37% |
| elephant | 90% |

| category | frequency | relative frequency |
|---|---|---|
| panther | 8 | 18% |
| zebra | 12 | 28% |
| lion | 23 | 54% |

| height | weight | eye color | animal (encoded) |
|---|---|---|---|
| 256 | 1700 | brown | elephant |
| 35 | 8 | blue | cat |
| 110 | 120 | black | others |
| 95 | 150 | brown | others |
| 105 | 145 | brown | others |
| ... | ... | ... | ... |

Classification Results

Target Variable: Animal           Model Type: Multi-Class Classification Input Dataset:

| height | weight | eye color |
|---|---|---|
| 256 | 1700 | brown |
| 35 | 8 | blue |
| 110 | 120 | black |
| 95 | 150 | brown |
| 105 | 145 | brown |

| height | weight | eye color | Prediction |
|---|---|---|---|
| 256 | 1700 | brown | Elephant |
| 35 | 8 | blue | Cat |
| 110 | 120 | black | others |
| 95 | 150 | brown | others |
| 105 | 145 | brown | others |

| category | relative freq. |
|---|---|
| panther | 18% |
| zebra | 28% |
| lion | 54% |

COMPRESSION OF TARGET VARIABLE FOR MULTI-CLASS CLASSIFICATION

BACKGROUND

Supervised learning is a type of machine learning in which a model is trained based on a training dataset, where each instance of the dataset includes a target dimension and other specified dimensions. Supervised learning algorithms use the training dataset to iteratively train a model to map the other specified dimensions to the target dimension. The trained model can then be used to infer a value of the target dimension based on input data which includes the specified dimensions. For purposes of the present description, the dimensions, or columns, of data records will be referred to as variables.

Supervised learning may be used to train a binary classification task. To train such a task, the target variable in the training dataset includes only two categories, which are mutually exclusive (e.g., "dog" and "not dog"). The binary classification task is trained to determine one of the two categories based on values of a set of input variables. Binary classification tasks have been extensively researched. As a result, many sophisticated methods exist for improving the prediction accuracy and the operational cost efficiency of a binary classification task.

In multi-class classification, the target variable includes more than two possible categories (e.g., "dog", "cat" and "bear"). Less research attention has been paid to accuracy issues and cost efficiencies relating to multi-class classification. However, the potential uses of multi-class classification are widespread.

The number of categories (i.e., the cardinality) of the target variable may be quite high in modern scenarios. The distribution of these categories throughout a training dataset may also be extremely unbalanced (e.g., where <20% of the categories are present in >80% of the records). For instance, if the target variable represents the products of a retail company, most transactions represented in the company records may be associated with a small number of top-selling products. Unfortunately, as the cardinality of the target variable increases, resource utilization (e.g., learning time, memory footprint and CPU cycles) increases. High cardinality of a target variable may also harm model accuracy because infrequently-seen categories may introduce informational noise which biases the trained classification logic.

Systems are desired to efficiently train a suitably-accurate multi-class classifier using a training dataset which may include high-cardinality and unevenly-distributed target variable categories.

DETAILED DESCRIPTION

The following description is provided to enable any person in the art to make and use the described embodiments. Various modifications, however, will be readily-apparent to those in the art.

Some embodiments mitigate accuracy degradation and resource consumption in a multi-class classifier caused by high target variable cardinality within a training dataset. Moreover, embodiments may increase interpretability of the trained multi-class classifier by encoding the training dataset to simplify the target variable categorical structure.

According to some embodiments, infrequent and non-separable target variable categories within a training dataset are identified. The target variable categories of the training dataset are then encoded to replace the infrequent and non-separable target variable categories with a general "others" category. A multi-class classifier is trained using the encoded training dataset.

Infrequent target variable categories are categories which rarely appear in the training dataset. Non-separable categories, on the other hand, are categories which a classifier is not capable of predicting with high confidence. An infrequent category may be separable if its input variables are discriminant enough to predict the category with confidence.

In other words, if the typical input variable values associated with an infrequent category are very specific to the infrequent category, a classifier should be able to predict this category with confidence. Accordingly, replacing this category in the training dataset with the general "others" category would negatively impact the overall prediction accuracy of the subsequently-trained classifier. Some embodiments thereby identify categories of the training dataset which the classifier is not likely to predict well and compresses and anonymizes only those categories within the training dataset.

Figure 1:
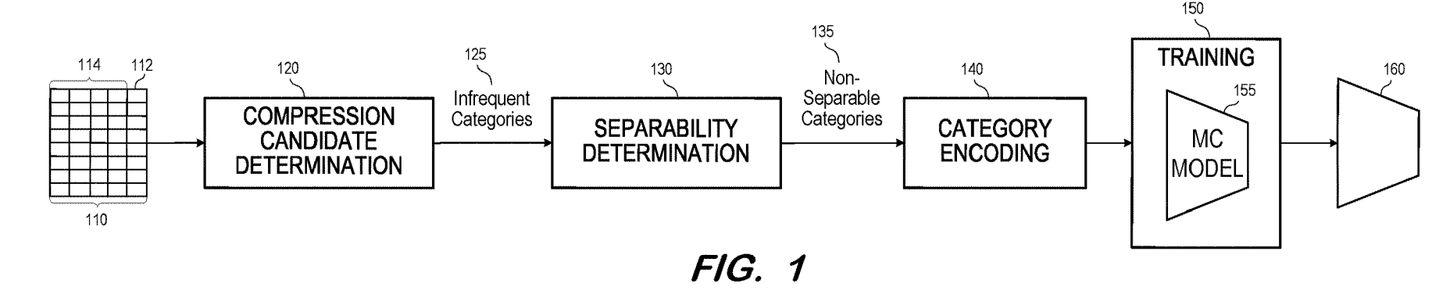
FIG. 1 is a block diagram representing training of a multi-class classifier according to some embodiments.

FIG. 1 is a block diagram representing training of a multi-class classifier according to some embodiments. The illustrated components may be implemented using any suitable combination of computing hardware and/or software that is or becomes known. In some embodiments, two or more components are implemented by a single computing device. Two or more components of FIG. 1 may be co-located. One or more components may be implemented as a cloud service (e.g., Software-as-a-Service, Platform-as-a-Service). A cloud-based implementation of any components of FIG. 1 may apportion computing resources elastically according to demand, need, price, and/or any other metric.

Training dataset 110 may comprise records of a database table. The records may comprise a query result based on one or more persisted database tables of a database, for example. In some embodiments, training dataset 110 comprises a random sampling of records from a much larger set of records.

Each record or row of training dataset 110 will be referred to as an instance. Each instance of training dataset 110 includes a value of a corresponding variable (i.e., column, feature, etc.). The values of each variable may conform to any suitable format.

The variables of training dataset 110 includes target variable 112 and input variables 114. According to some embodiments, target variable 112 is a categorical variable. Therefore, the value of target variable 112 within each instance of dataset 110 is a category. In one non-exhaustive example, target variable 112 is "Animal" and its values include types of animals.

Compression candidate determination component 120 determines whether to compress the values of target variable 112 prior to using dataset 110 to train a multi-class classifier. Since target variable compression according to some embodiments may be useful in the case of a dataset including high-cardinality and unevenly-distributed target variable categories, compression candidate determination component 120 may operate to determine whether dataset 110 includes high-cardinality and unevenly-distributed target variable categories.

If so, compression candidate determination component 120 outputs identifiers of infrequent categories 125. Infrequent categories 125 are categories of target variable 112 which appear relatively less-often that other categories of target variable 112 within dataset 110. Specific methods for determining infrequent categories according to some embodiments will be described below.

Separability determination component 130 receives the identifiers of infrequent categories 125. From the infrequent categories 125, separability component 130 determines two or more non-separable categories 135. Determination of non-separable categories 135 may comprise training of a multi-class classifier as will be described below.

The determined non-separable categories 135 may comprise categories which a classifier trained using dataset 110 would likely not be capable of predicting with high confidence. In some scenarios, this incapability may be due to the input variable values of instances including these categories being not discriminant enough from (i.e., too similar to) the input variable values of instances including other categories.

Category encoding component 140 modifies some of the values of target variable 112 of dataset 110. In some embodiments, category encoding component 140 identifies those instances of dataset 110 in which the value of target variable 112 is a non-separable category 135. The value of target variable 112 in each of the identified instances is changed to a single common value such as, e.g., "others", resulting in a modified dataset.

Training component 150 may comprise any suitable algorithms and hardware for training multi-class classification model 155 based on the modified dataset. Model 155 may comprise any type of iterative learning-compatible network, algorithm, decision tree, etc., that is or becomes known. Model 155 may be designed to perform multi-class classification on the training dataset (i.e., inference of a category from a set of more than two known categories) where the target variable is encoded by grouping non-separable categories into a single (e.g., "others") category.

In some embodiments, model 155 implements a known "one vs rest" strategy to translate a multi-class classification task with a target variable cardinality of n into n separate binary classification tasks. Assuming an Animal target variable includes three categories (e.g., dog, cat, bear), a multi-class classification model 155 as is known in the art may be shaped as three binary classification models whose target binary categories are as follows: model 1: dog vs [cat, bear]; model 2: cat vs [dog, bear]; and model 3: bear vs [cat, bear]. A final multi-class decision is provided based on the decision probabilities output by each model. For example, given the probabilities: model 1: probability (dog instead of [cat, bear])=80%; model 2: probability (cat instead of [dog, bear])=70%; and model 3: probability (bear instead of [cat, bear])=45%, the output is [dog]. According to such a strategy, learning time grows more or less linearly with the cardinality of the target variable. Consequently, compressing the target variable as described herein may directly reduce learning time.

Classifier/model 160 may comprise a network of neurons which receive input, change internal state according to that input, and produce output depending on the input and internal state. The output of certain neurons is connected to the input of other neurons to form a directed and weighted graph. The weights as well as the functions that compute the internal states are iteratively modified during training using supervised learning algorithms as is known.

Generally, training of model 155 comprises inputting input variable values of each instance of the modified dataset into model 155, acquiring resulting categories output by model 155, comparing the output categories to corresponding actual categories of the instances, modifying model 155 based on the comparison, and continuing in this manner until the difference between the output categories and the actual categories (i.e., the network loss) is satisfactory. As described above, the "actual" categories include the original categories of target variable 112 of dataset 110, but with the non-separable categories having been compressed into a single category.

Trained multi-class classifier 160 results from the training by training component 150. Trained multi-class classifier 160 may be embodied by a set of linear equations, executable program code, a set of hyperparameters defining the structure of classifier 160 and a set of corresponding weights, or any other representation of the mapping of the input variables to the target variable which was learned as a result of the training.

Figure 2:
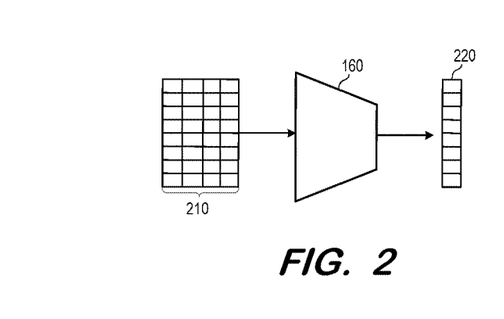
FIG. 2 is a block diagram representing use of a multi-class classifier trained according to some embodiments.

FIG. 2 illustrates usage of trained multi-class classifier 160 according to some embodiments. Each of input instances 210 includes a value of each one of input variables 114. Input instances 210 may comprise a single instance according to some embodiments.

Instances 210 are input to trained classifier 160 as is known in the art. In response, model 160 outputs output categories 220. Each of output categories 220 corresponds to a respective one of input instances 210. Generally, each of output categories 220 is a prediction/inference generated by model 160 based on the values of a respective input instance 210.

Input instances 210 may be received from any source which desires respective inferences of a target variable category based on input instances 210. In some embodiments, trained classifier 160 is implemented by a cloud service and instances 210 are input thereto and output categories 220 are received therefrom via a Web API.

Figure 3:
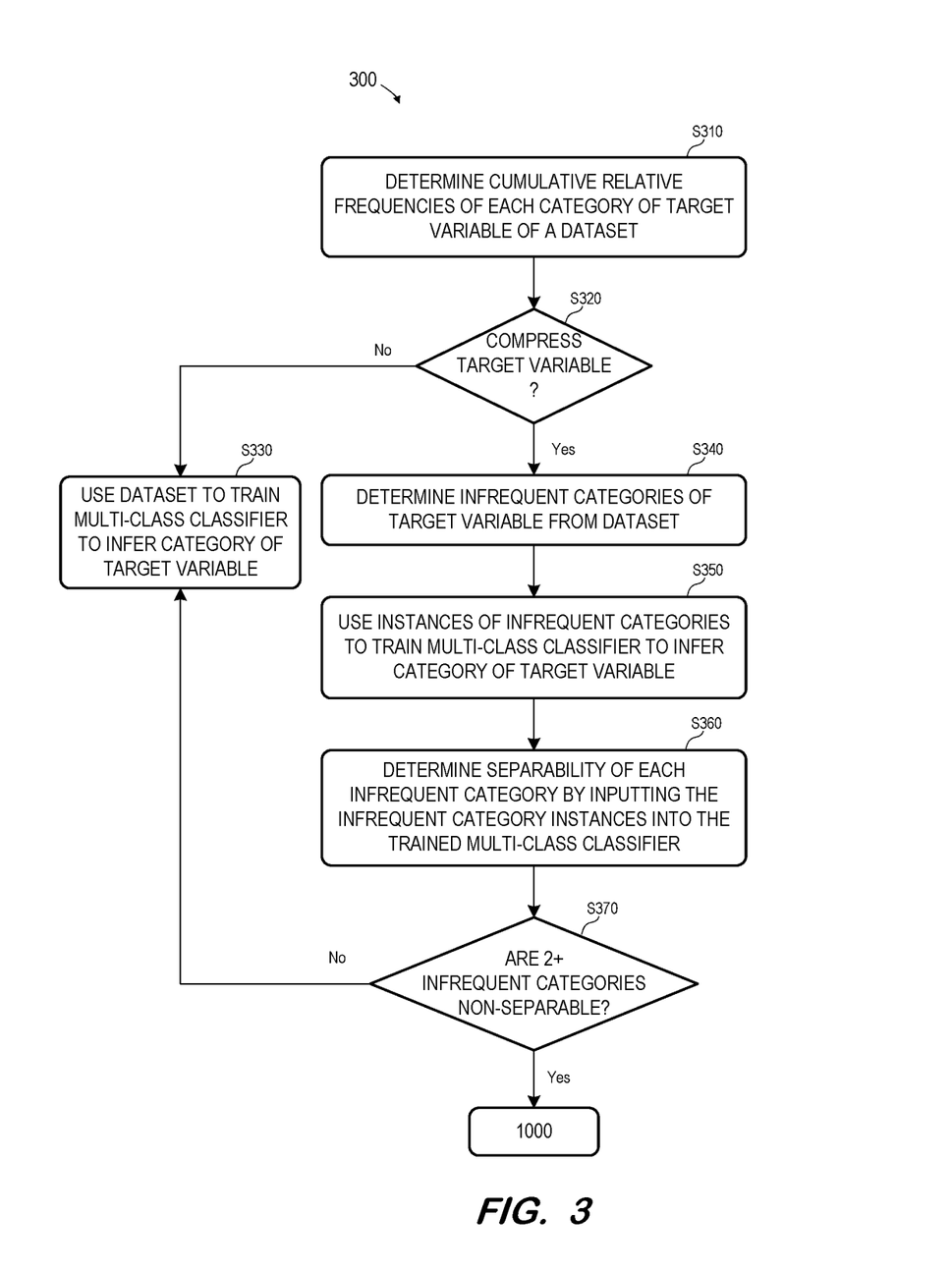
FIG. 3 is a flow diagram of a process to identify infrequent and non-separable target variable categories according to some embodiments.

FIG. 3 comprises a flow diagram of process 300 to identify infrequent and non-separable target variable categories within a dataset according to some embodiments. Process 300 and the other processes described herein may be performed using any suitable combination of hardware and software. Software program code embodying these processes may be stored by any non-transitory tangible medium, including a fixed disk, a volatile or non-volatile random access memory, a DVD, a Flash drive, or a magnetic tape, and executed by any one or more processing units, including but not limited to a microprocessor, a microprocessor core, and a microprocessor thread. Embodiments are not limited to the examples described below.

Process 300 may be initiated by a request to generate a multi-class classifier to predict an output category based on a set of input variable values. The request may include or reference a dataset based on which the classifier is to be generated. As described above, each instance of the dataset includes a value for each of a plurality of input variables and a target variable, where each value of the target variable is a category.

Figure 4:
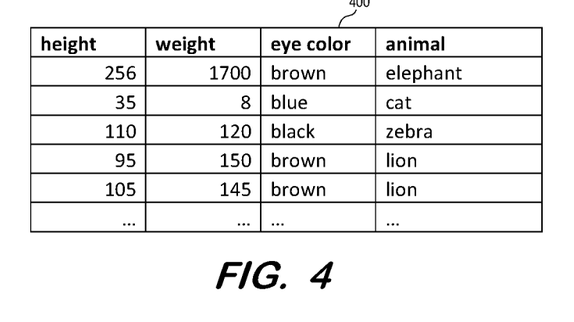
FIG. 4 is a tabular representation of instances of a training dataset according to some embodiments.

Cumulative relative frequencies of each category of the target variable of the dataset are initially determined at S310. FIG. 4 is a tabular representation of instances of training dataset 400 according to some embodiments. In the present example, the input variables of dataset 400 are "height", "weight" and "eye color" and the target variable is "animal".

Figure 5:
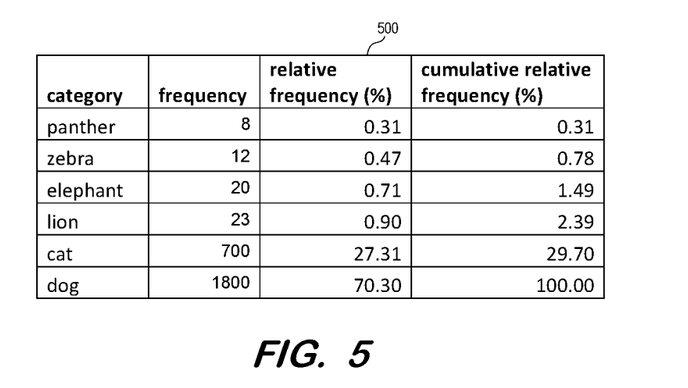
FIG. 5 is a table illustrating frequencies of target variable categories within a training dataset according to some embodiments.

Training dataset 400 may include many more instances and more target variable categories than depicted in FIG. 4. In this regard, FIG. 5 is a table illustrating frequencies of each target variable category within training dataset 400 according to some embodiments. As shown, dataset 400 includes six target variable categories among its 2563 instances.

FIG. 5 also shows the relative frequency with which each of the six target variable categories appears in dataset 400. The relative frequency for a given target variable category is determined as the ratio of the number of instances which include the given target variable category to the total number of instances of the dataset. The relative frequencies per category are sorted in ascending order and the cumulative relative frequency for each category is determined therefrom. In particular, the cumulative relative frequency for a category is equal to the sum of the relative frequency of the category and all relative frequencies which are less than the relative frequency of the category.

Next, at S320, it is determined whether to compress the target variable based on the determined cumulative relative frequencies. In one example of S320, the determination comprises a determination of whether a cardinality of the target variable exceeds a first threshold (e.g., 50) and a determination of whether the distribution of target variable categories is particularly imbalanced. The latter determination in some embodiments comprises a check of whether 20% of the most-frequent categories are present in more than 80% of the total instances.

Flow proceeds to S330 if it is determined at S320 to not compress the target variable. At S330, the original and unmodified dataset is used to train a multi-class classifier to infer a category of the target variable as is known in the art.

In the present example of FIGS. 4 and 5, it will be assumed that it is determined at S320 to not compress the target variable. Flow therefore proceeds to S340 to determine infrequent categories of the target variable from the dataset. The determination of S340 may be based on cumulative relative frequencies calculated as shown in FIG. 5. For example, all categories associated with a cumulative relative frequency less than or equal to a threshold may be determined at S340 as the infrequent categories. Using an example threshold of 5%, the categories [panther, zebra, elephant and lion] are determined as the infrequent categories at S340.

Figure 6:
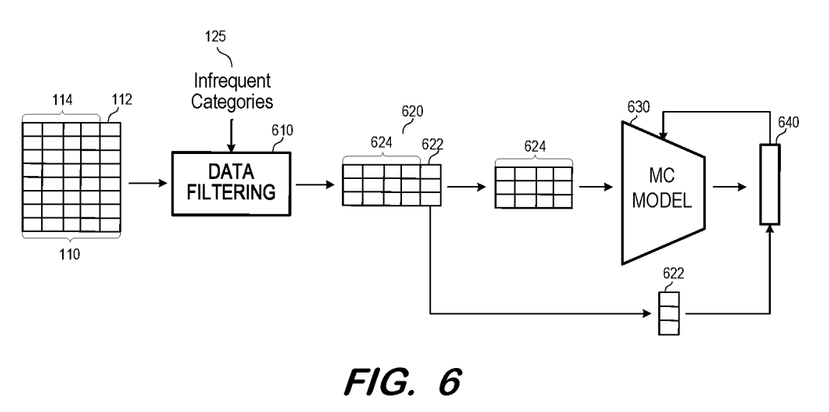
FIG. 6 is a block diagram illustrating training of a multi-class classifier based on training dataset instances associated with infrequent target variable categories according to some embodiments.

S350 and S360 may comprise a determination of non-separable categories according to some embodiments. At S350, instances of the dataset which include the infrequent categories are used to train a multi-class classifier to infer category of the target variable. FIG. 6 illustrates training a multi-class classifier based on instances of the dataset which include the infrequent categories according to some embodiments.

As shown, data filtering component 610 filters dataset 110 based on infrequent categories 125 determined as described above. In particular, filtering component 610 acquires only those instances of dataset 110 in which the value of target variable 112 is one of infrequent categories 125. The resulting instances are depicted as instances 620.

The values of the input variables 624 of each instance 620 are used to train multi-classification model 630 at S350. Training at S350 may comprise execution of training iterations. One iteration according to some embodiments may include inputting values of the input variables 624 of a subset (i.e., a batch) of instances 620 to model 630, operating model 630 to output corresponding inferred categories, operating loss layer 640 to receive the output categories and evaluate a loss function based on the output categories and known ground truth categories 622 of instances 620, and modifying model 630 based on the evaluation. Iterations continue in this manner until model performance is determined to be satisfactory. Since the number of instances 620 is likely small because the instances 620 are only associated with "infrequent" categories, the training at S350 is expected to proceed quickly in some embodiments.

Figure 7:
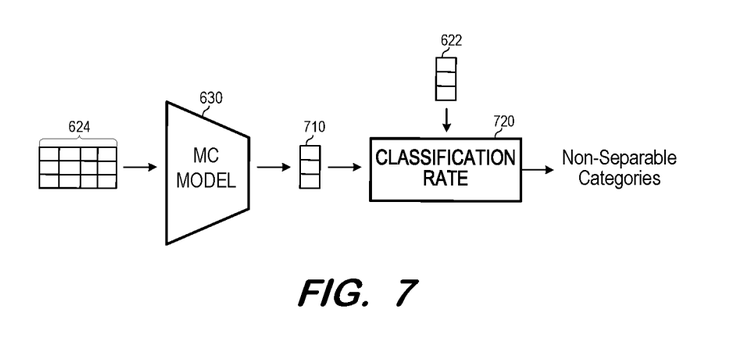
FIG. 7 is a block diagram illustrating use of a trained multi-class classifier to determine non-separable target variable categories according to some embodiments.

The separability of each infrequent category is determined at S360 by inputting the infrequent category instances into the classifier trained at S350. As shown in the FIG. 7 example, the values of the input variables 624 of each instance 620 are input to trained model 630 to generate output categories 710. Classification rate component 720 determines a classification rate for each of the infrequent categories based on output categories 710 and ground truth categories 622 of each instance 620.

Figure 8:
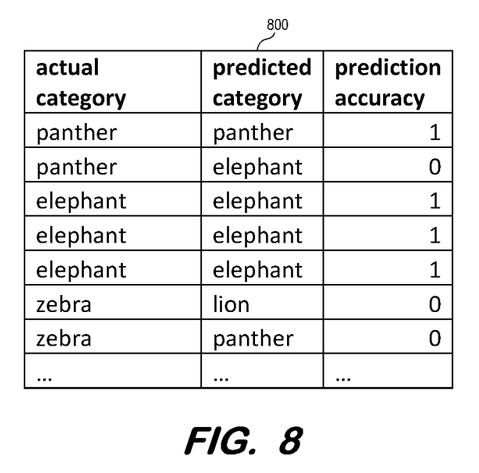
FIG. 8 is a table illustrating predictions of a trained multi-class classifier for each training dataset instance associated with an infrequent target variable category according to some embodiments.

FIG. 8 shows table 800 showing the output category (i.e., predicted category) and ground truth category (i.e., actual category) for each instance of dataset 400 which includes an infrequent category. The prediction accuracy for an instance is 1 if the output and ground truth categories match, and 0 otherwise.

Figure 9:
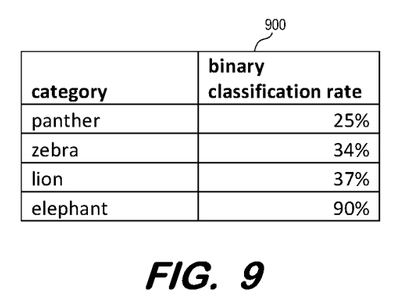
FIG. 9 is a table illustrating a binary classification rate of a trained multi-class classifier for each infrequent target variable category according to some embodiments.

FIG. 9 includes table 900 showing a binary classification rate determined for each infrequent category. The binary classification rate for a given infrequent category is equal to the number of accurate predictions of the category divided by the total number of instances including the category.

Separability of each infrequent category may be determined at S360 based on their respective binary classification rates. For example, a category may be considered separable if the binary classification rate of the category is greater than a predefined threshold (e.g., 80%). According to table 900 and an assumed 80% threshold, the category [elephant] is determined to be separable and the categories [panther, zebra, lion] are determined as non-separable.

At S370, it is determined whether two or more of the infrequent categories were determined as non-separable at S370. If not, flow returns to S330 to train a multi-class classifier using the original dataset. If so, flow proceeds to process 1000 of FIG. 10.

Figure 10:
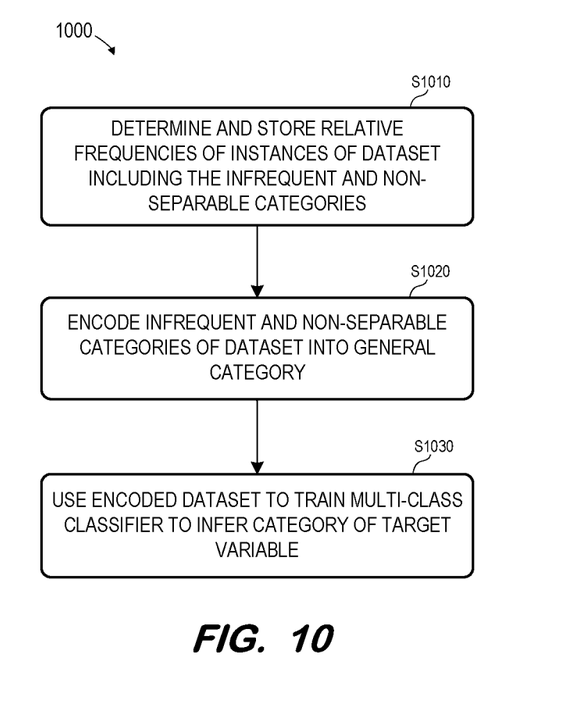
FIG. 10 is a flow diagram of a process to train a multi-class classifier based on training dataset instances associated with encoded target variable categories according to some embodiments.
Figure 11:
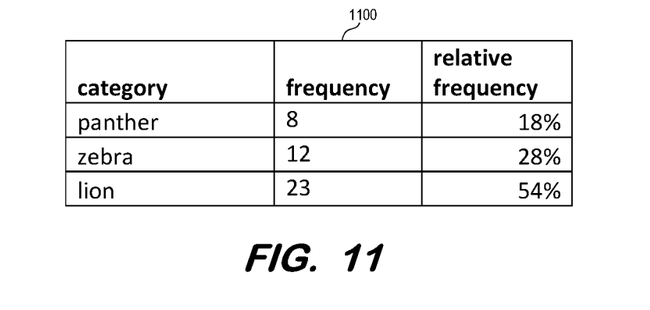
FIG. 11 is a table illustrating a frequency of each infrequent and non-separable target variable category in a training dataset according to some embodiments.

At S1010, the relative frequencies of the dataset instances which include the infrequent and non-separable categories are determined and stored. Continuing the present example of non-separable categories [panther, zebra, lion], table 1100 of FIG. 11 shows both the number of instances of the original dataset which include each non-separable category and also the relative frequency (i.e., the ratio of the number of category instances to the number of total dataset instances) for each category.

Figure 12:
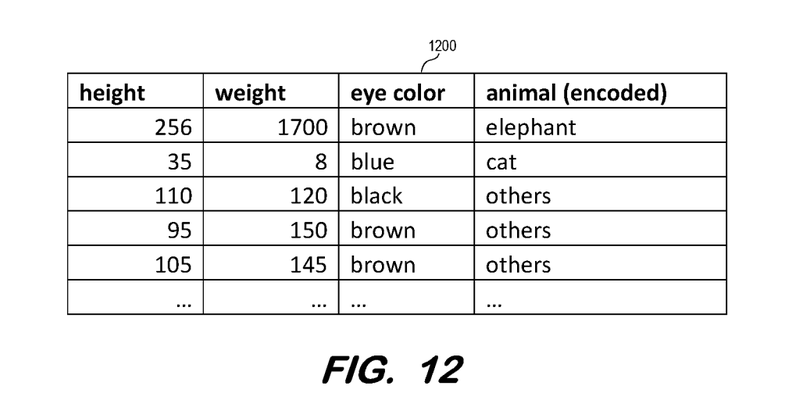
FIG. 12 is a tabular representation of training dataset instances associated with encoded target variable categories according to some embodiments

Next, at S1020, each infrequent and non-separable category of the original dataset is encoded into a single general category. S1020 may include identifying those instances of the dataset 110 in which the value of the target variable is a non-separable category. Then, the value of the target variable in each of the identified instances is changed to a single common value. FIG. 12 illustrates modified dataset 1200 in which each instance of [panther, zebra, lion] in original dataset 400 has been changed to "others" at S1020. The particular value of the single general category may depends on the data type of the target variable (e.g., string, integer, number, date) and may be, for example, a string (i.e., "others"), a specific integer (e.g., 7210000), a specific number (e.g., infinite), etc. Generally, the single general value should not be present among the target variable values of dataset 400.

Figure 13:
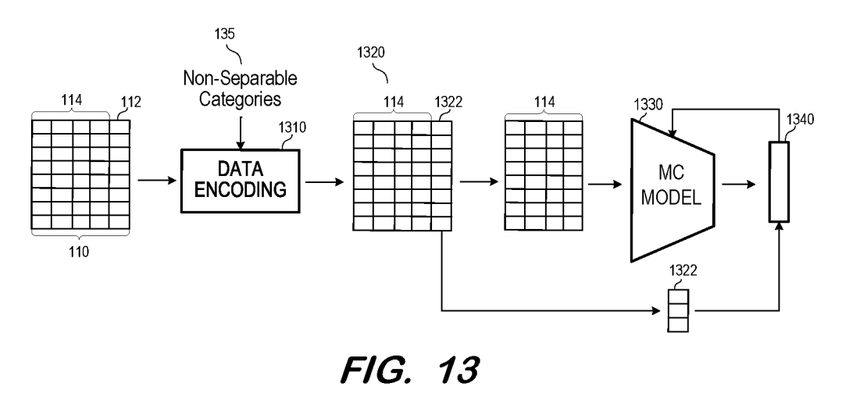
FIG. 13 is a block diagram illustrating training a multi-class classifier based on training dataset instances associated with encoded target variable categories according to some embodiments.

The thusly-encoded dataset is used to train a multi-class classifier to infer a category of a target variable at S1030. FIG. 13 depicts the training at S1030 according to some embodiments. As shown, data encoding component 1310 changes the values of non-separable categories 135 of target variable 112 to a single general category, resulting in modified dataset 1320 including modified values 1322 of target variable 112.

Model 1330 may be trained by inputting batches of values of input variables 114 into model 1330, acquiring resulting categories output by model 1330 at loss layer 1340, comparing the output categories to corresponding modified values 1322 of the instances, modifying model 1330 based on the comparison, and continuing in this manner until the difference between the output categories and the modified categories is satisfactory.

Figure 14:
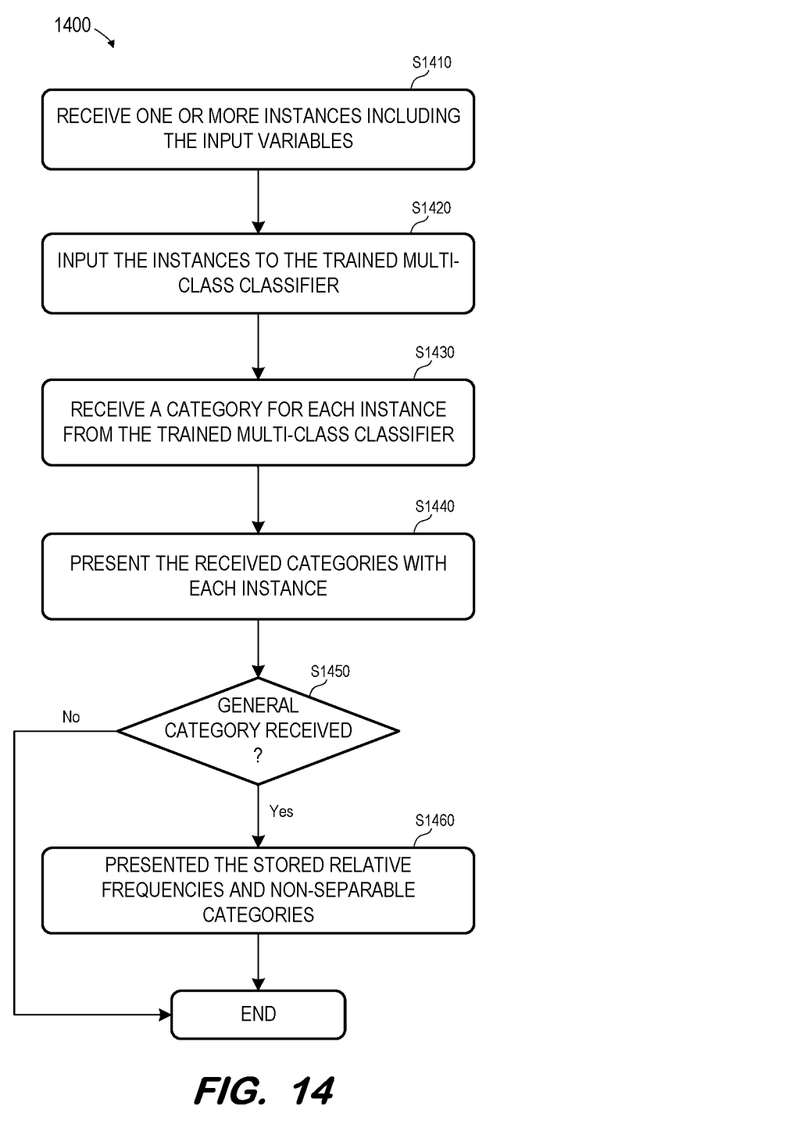
FIG. 14 is a flow diagram of a process to use a trained a multi-class classifier to infer and present one or more target variable categories according to some embodiments.

FIG. 14 illustrates process 1400 to use a multi-class classifier trained as described herein. At S1410, one or more instances including values of the input variables are received. The instances are input to the trained classifier at S1430, and, in response, the trained model outputs an output category for each received instance.

Figure 15:
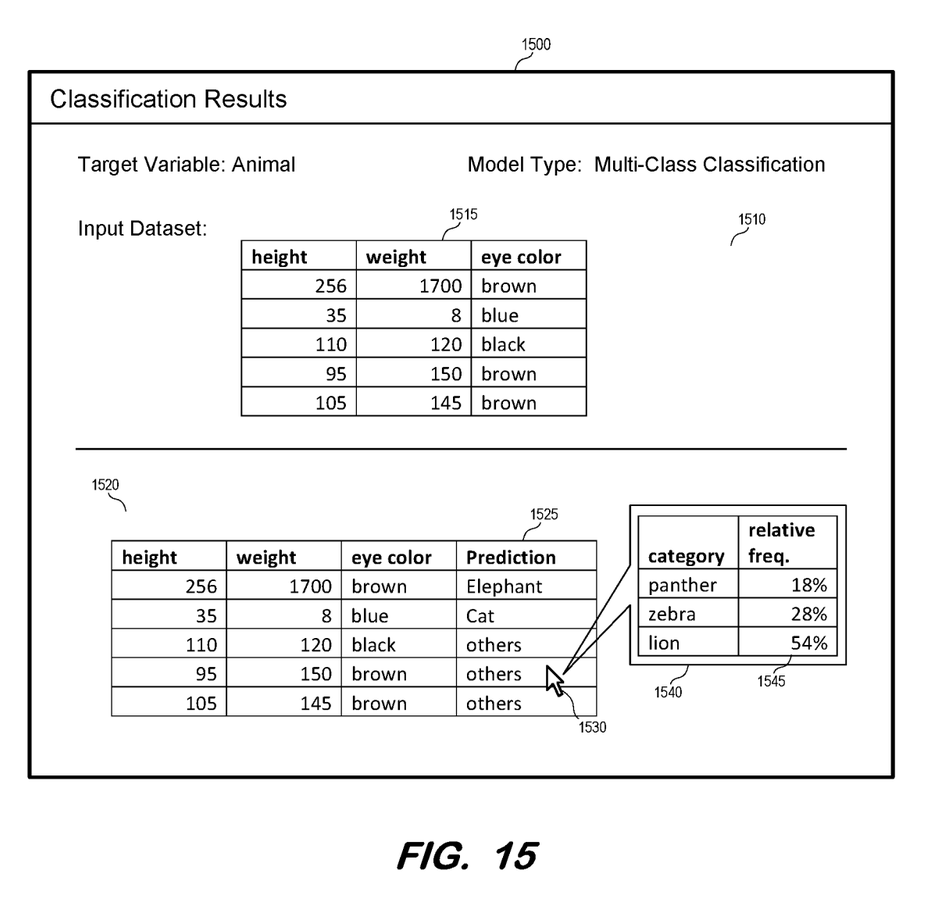
FIG. 15 illustrates an interface presenting one or more target variable categories inferred by a multi-class classifier trained according to some embodiments.

The output categories are received at S1430. The received categories may be presented along with each instance at S1440. FIG. 15 illustrates interface 1500 presenting classification results according to some embodiments. Interface 1500 may be presented by a user device executing a client application (e.g., a Web application) which provides training of machine learning models.

Interface 1500 includes area 1510 presenting an input dataset 1515 and identifying a target variable. Table 1525 of area 1520 shows the output category predicted by the trained classifier for each instance. As shown, the categories may include an "others" category. Returning to process 1400, if the categories include such a general category, flow proceeds to S1450 to present non-separable categories and their stored relative frequencies. The presentation at S1450 may be invoked by hovering mouse cursor 1530 over the displayed general category, resulting in presentation of table 1540. Presentation of the non-separable categories and their stored relative frequencies 1545 provides the user with some context behind the "others" category.

Figure 16:
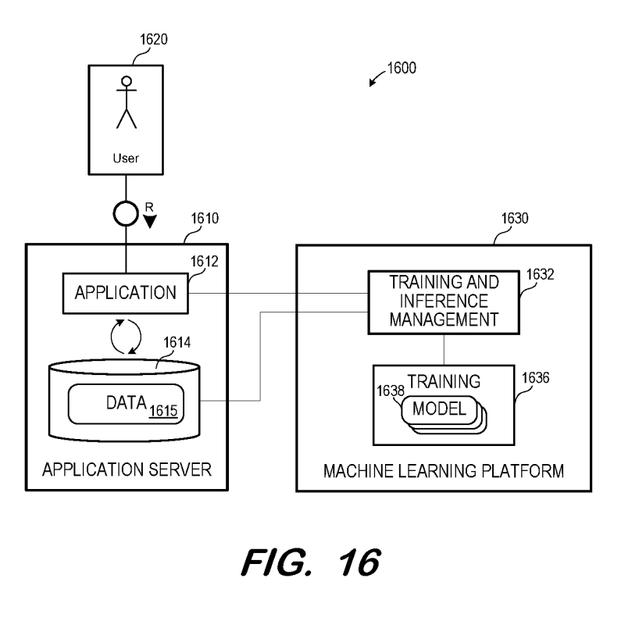
FIG. 16 illustrates a system to provide model training to applications according to some embodiments.

FIG. 16 illustrates system 1600 to provide model training to applications according to some embodiments. Application server 1610 may comprise an on-premise or cloud-based server providing an execution platform and services to applications such as application 1612. Application 1612 may comprise program code executable by a processing unit to provide functions to users such as user 1620 based on logic and on data 1615 stored in data store 1614. Data 1615 may be column-based, row-based, object data or any other type of data that is or becomes known. Data store 1614 may comprise any suitable storage system such as a database system, which may be partially or fully remote from application server 1610, and may be distributed as is known in the art.

According to some embodiments, user 1620 may interact with application 1612 (e.g., via a Web browser executing a client application associated with application 1612) to request a trained model based on training data records. The request may specify a target variable of the records. In response, application 1612 may call training and inference management component 1632 of machine learning platform 1630 to request training of a corresponding model according to some embodiments.

Based on the request, training and inference management component 1632 may receive the specified training data from data 1615 and instruct training component 1636 to train a model 1638 based on the training data as described herein. Application 1612 may then use the trained model to generate inferences based on input data selected by user 1620.

In some embodiments, application 1612 and training and inference management component 1632 may comprise a single system, and/or application server 1610 and machine learning platform 1630 may comprise a single system. In some embodiments, machine learning platform 1630 supports model training and inference for applications other than application 1612 and/or application servers other than application server 1610.

Figure 17:
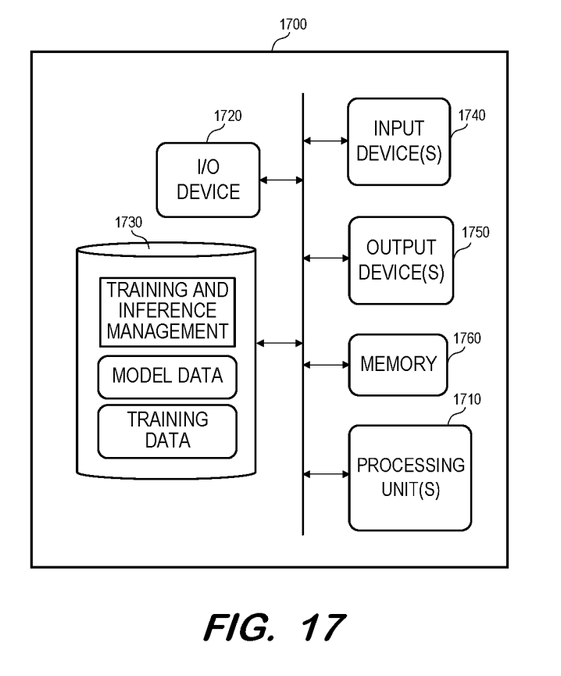
FIG. 17 is a block diagram of a hardware system for providing model training according to some embodiments.

FIG. 17 is a block diagram of a hardware system providing model training according to some embodiments. Hardware system 1700 may comprise a general-purpose computing apparatus and may execute program code to perform any of the functions described herein. Hardware system 1700 may be implemented by a distributed cloud-based server and may comprise an implementation of machine learning platform 1630 in some embodiments. Hardware system 1700 may include other unshown elements according to some embodiments.

Hardware system 1700 includes processing unit(s) 1710 operatively coupled to I/O device 1720, data storage device 1730, one or more input devices 1740, one or more output devices 1750 and memory 1760. I/O device 1720 may facilitate communication with external devices, such as an external network, the cloud, or a data storage device. Input device(s) 1740 may comprise, for example, a keyboard, a keypad, a mouse or other pointing device, a microphone, knob or a switch, an infra-red (IR) port, a docking station, and/or a touch screen. Input device(s) 1740 may be used, for example, to enter information into hardware system 1700. Output device(s) 1750 may comprise, for example, a display (e.g., a display screen) a speaker, and/or a printer.

Data storage device 1730 may comprise any appropriate persistent storage device, including combinations of magnetic storage devices (e.g., magnetic tape, hard disk drives and flash memory), optical storage devices, Read Only Memory (ROM) devices, and RAM devices, while memory 1760 may comprise a RAM device.

Data storage device 1730 stores program code executed by processing unit(s) 1710 to cause system 1700 to implement any of the components and execute any one or more of the processes described herein. Embodiments are not limited to execution of these processes by a single computing device. Data storage device 1730 may also store data and other program code for providing additional functionality and/or which are necessary for operation of hardware system 1700, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation some embodiments may include a processor to execute program code such that the computing device operates as described herein.

Embodiments described herein are solely for the purpose of illustration. Those in the art will recognize other embodiments may be practiced with modifications and alterations to that described above.

What is claimed is:

1. A system comprising:
    a memory storing processor-executable program code; and
    at least one processing unit to execute the processor-executable program code to cause the system to:
    determine a dataset comprising a plurality of instances, each instance comprising a value of each of a plurality of input variables and of a target variable, where the values of the target variable comprise a plurality of categories;
    determine two or more infrequent categories of the plurality of categories from the dataset;
    train a classifier to output a value of the target variable based on instances of the dataset including the infrequent categories and on no other instances of the dataset;
    determine two or more non-separable categories from the two or more infrequent categories based on an output of the trained classifier for each instance of the dataset including the infrequent categories;
    change occurrences of the two or more non-separable categories within the dataset to a single category to generate a modified dataset; and
    train a second classifier to output a value of the target variable based on the modified dataset.

2. A system according to claim 1, wherein determination of the two or more infrequent categories comprises:
    determination, for each of the plurality of categories, of a ratio of a number of instances including the category to a total number of instances of the dataset; and
    determination of the two or more infrequent categories based on the ratios.

3. A system according to claim 2, wherein determination of the two or more infrequent categories based on the ratios comprises:
    determination of categories for which the ratio is less than a threshold.

4. A system according to claim 1, wherein determination of the two or more non-separable categories from the two or more infrequent categories comprises:
    for each of the two or more infrequent categories, determination of a classification rate based on the output of the trained classifier for each instance of the dataset including the infrequent category; and
    determination of the two or more non-separable categories based on the classification rates.

5. A system according to claim 4, wherein determination of the two or more infrequent categories comprises:
    determination, for each of the plurality of categories, of a ratio of a number of instances including the category to a total number of instances of the dataset; and
    determination of two or more of the plurality of categories for which the ratio is less than a threshold.

6. A method comprising:
    determining a dataset comprising a plurality of instances, each instance comprising a value of each of a plurality of input variables and of a target variable, where the values of the target variable comprise a plurality of categories;
    determining two or more infrequent categories of the plurality of categories from the dataset based on a frequency of each of the plurality of categories in the dataset;
    training a classifier to output a value of the target variable based on instances of the dataset including the infrequent categories and on no other instances of the dataset;
    determining two or more non-separable categories from the two or more infrequent categories based on an output of the trained classifier for each instance of the dataset including the infrequent categories;
    changing occurrences of the two or more non-separable categories within the dataset to a single category to generate a modified dataset;
    training a second classifier to output a value of the target variable based on the modified dataset;
    receiving an input instance comprising an input value of each of the plurality of input variables; and inputting the input instance into the trained second classifier to output an output value of the target variable.

7. A method according to claim 6, wherein determining the two or more infrequent categories comprises:
  determining, for each of the plurality of categories, a ratio of a number of instances including the category to a total number of instances of the dataset; and
  determining the two or more infrequent categories based on the ratios.

8. A method according to claim 7, wherein determining the two or more infrequent categories based on the ratios comprises:
  determining categories for which the ratio is less than a threshold.

9. A method according to claim 6, wherein determining the two or more non-separable categories from the two or more infrequent categories comprises:
  for each of the two or more infrequent categories, determining a classification rate based on the output of the trained classifier for each instance of the dataset including the infrequent category; and
  determining the two or more non-separable categories based on the classification rates.

10. A method according to claim 9, wherein determining the two or more infrequent categories comprises:
  determining, for each of the plurality of categories, a ratio of a number of instances including the category to a total number of instances of the dataset; and
  determining two or more of the plurality of categories for which the ratio is less than a threshold.

11. A non-transitory medium storing executable program code executable by at least one processing unit of a computing system to cause the computing system to:
  determine a dataset comprising a plurality of instances, each instance comprising a value of each of a plurality of input variables and of a target variable, where the values of the target variable comprise a plurality of categories;
  determine two or more infrequent categories of the plurality of categories from the dataset;
  train a classifier to output a value of the target variable based on instances of the dataset including the infrequent categories and on no other instances of the dataset;
  determine two or more non-separable categories from the two or more infrequent categories based on an output of the trained classifier for each instance of the dataset including the infrequent categories;
  change occurrences of the two or more non-separable categories within the dataset to a single category to generate a modified dataset; and
  train a second classifier to output a value of the target variable based on the modified dataset.

12. A medium according to claim 11, wherein determination of the two or more infrequent categories comprises:
  determination, for each of the plurality of categories, of a ratio of a number of instances including the category to a total number of instances of the dataset; and
  determination of the two or more infrequent categories based on the ratios.

13. A medium according to claim 12, wherein determination of the two or more infrequent categories based on the ratios comprises:
  determination of categories for which the ratio is less than a threshold.

14. A medium according to claim 11, wherein determination of the two or more non-separable categories from the two or more infrequent categories comprises:
  for each of the two or more infrequent categories, determine a classification rate based on the output of the trained classifier for each instance of the dataset including the infrequent category; and
  determination of the two or more non-separable categories based on the classification rates.

15. A medium according to claim 14, wherein determination of the two or more infrequent categories comprises:
  determination, for each of the plurality of categories, of a ratio of a number of instances including the category to a total number of instances of the dataset; and
  determination of two or more of the plurality of categories for which the ratio is less than a threshold.

* * * * *